US012111590B2

(12) United States Patent
Omori et al.

(10) Patent No.: US 12,111,590 B2
(45) Date of Patent: Oct. 8, 2024

(54) FIXING DEVICE HAVING REDUCED INCREASE IN ROTATIONAL TORQUE OF SECOND ROTATABLE MEMBER PROVIDING AN IMAGE WITH REDUCED UNEVENNESS IN GLOSS TO BE FORMED AND IMAGE FORMING APPARATUS USING THE SAME

(71) Applicant: FUJIFILM Business Innovation Corp., Tokyo (JP)

(72) Inventors: Kenji Omori, Kanagawa (JP); Hideaki Ohara, Kanagawa (JP); Ryohei Yoshikawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/153,106

(22) Filed: Jan. 11, 2023

(65) Prior Publication Data

US 2024/0094664 A1 Mar. 21, 2024

(30) Foreign Application Priority Data

Sep. 1, 2022 (JP) ................................ 2022-139541

(51) Int. Cl.
*G03G 15/20* (2006.01)

(52) U.S. Cl.
CPC ..... *G03G 15/2025* (2013.01); *G03G 15/2064* (2013.01)

(58) Field of Classification Search
USPC ........................................................ 399/325
See application file for complete search history.

(56) References Cited

U.S. PATENT DOCUMENTS

| | | | | |
|---|---|---|---|---|
| 6,148,169 A * | 11/2000 | Tsukamoto ........ | G03G 15/2064 399/328 |
| 2004/0131401 A1* | 7/2004 | Nakatogawa ...... | G03G 15/2053 399/328 |

(Continued)

FOREIGN PATENT DOCUMENTS

| | | |
|---|---|---|
| JP | 4683156 B2 | 5/2011 |
| JP | 2019-120817 A | 7/2019 |
| JP | 2021-196571 A | 12/2021 |

*Primary Examiner* — Quana Grainger
(74) *Attorney, Agent, or Firm* — Sughrue Mion, PLLC

(57) ABSTRACT

A fixing device includes: a first rotatable member; a second rotatable member disposed in contact with the first rotatable member; a pressing member that is disposed on an inner circumferential surface of the second rotatable member and presses the inner circumferential surface of the second rotatable member such that the second rotatable member is pressed against the first rotatable member; a sliding member interposed between the inner circumferential surface of the second rotatable member and the pressing member; and a lubricant interposed between the inner circumferential surface of the second rotatable member and the sliding member. The inner circumferential surface of the second rotatable member contains a resin having at least one group selected from the group consisting of an amido group, an imido group, a ketone group, and a sulfide group. A sliding surface of the sliding member contains a heat resistant thermoplastic resin other than a fluorocarbon resin and a resin having a siloxane group that is other than the heat resistant thermoplastic resin. The lubricant contains an oil having a siloxane group in a main chain.

20 Claims, 2 Drawing Sheets

(56) References Cited

U.S. PATENT DOCUMENTS

| | | | | |
|---|---|---|---|---|
| 2017/0139360 | A1* | 5/2017 | Nagai | G03G 15/206 |
| 2018/0173141 | A1* | 6/2018 | Nagai | G03G 15/2025 |

* cited by examiner

FIXING DEVICE HAVING REDUCED INCREASE IN ROTATIONAL TORQUE OF SECOND ROTATABLE MEMBER PROVIDING AN IMAGE WITH REDUCED UNEVENNESS IN GLOSS TO BE FORMED AND IMAGE FORMING APPARATUS USING THE SAME

CROSS-REFERENCE TO RELATED APPLICATIONS

This application is based on and claims priority under 35 USC 119 from Japanese Patent Application No. 2022-139541 filed Sep. 1, 2022.

BACKGROUND

(i) Technical Field

The present disclosure relates to a fixing device and an image forming apparatus.

(ii) Related Art

For example, Japanese Patent No. 4683156 discloses "a fixing device including: a rotatable rotation member; a rotatable resin film tubular body that is pressed against the rotation member, holds a recording medium having an unfixed toner image transferred thereon in a nip portion formed between the tubular body and the rotation member to thereby fix the unfixed toner image to the recording medium; a pressing member that is disposed on the inner side of the resin film tubular body and presses the fixing tubular body against the rotation member; a sheet-shaped sliding member that is interposed between the resin film tubular body and the pressing member and includes a non-porous sheet in which at least its sliding surface contains a heat resistant resin, the non-porous sheet being disposed on a substrate having surface irregularities, the sheet-shaped sliding member being prepared by impregnating the substrate with a fluorocarbon resin having a melting point equal to or lower than the melting point of the heat resistant resin included in the non-porous sheet and heating and pressing the non-porous sheet and the substrate to stack them together using the fluorocarbon resin as an adhesive; and a lubricant interposed between the resin film tubular body and the sheet-shaped sliding member."

Japanese Unexamined Patent Application Publication No. 2019-120817 discloses "a sliding member including a substrate and a lubricant contained in the substrate, wherein the substrate contains heat resistant polymer fibers having first functional groups and cellulose fibers, wherein the heat resistant polymer fibers have an average fiber diameter of from 0.5 μm to 20 μm inclusive, wherein the cellulose fibers have an average fiber diameter of 1000 nm or less, wherein the lubricant contains a modified silicone oil having second functional groups that react with the first functional groups, and wherein some or all of the first functional groups are reacted with the second functional groups."

Japanese Unexamined Patent Application Publication No. 2021-196571 discloses "an endless belt member used for an image forming apparatus and having an inner circumferential surface with a lubricant adhering thereto, wherein the inner circumferential surface of the belt member has irregularities, wherein the difference between the solubility parameter of the inner circumferential surface of the belt member and the solubility parameter of the lubricant is 1.0 $(MPa)^{0.5}$ or less.

SUMMARY

A fixing device including a first rotatable member, a second rotatable member disposed in contact with the first rotatable member, a pressing member that is disposed on the inner circumferential surface of the second rotatable member and presses the inner circumferential surface of the second rotatable member such that the second rotatable member is pressed against the first rotatable member, a sliding member interposed between the inner circumferential surface of the second rotatable member and the pressing member, and a lubricant interposed between the inner circumferential surface of the second rotatable member and the sliding member is a known art (this fixing device is referred to also as a specific fixing device).

Aspects of non-limiting embodiments of the present disclosure relate to a fixing device in which the increase in the rotational torque of the second rotatable member is reduced and which allows an image with reduced unevenness in gloss to be formed, in contrast to a specific fixing device in which the inner circumferential surface of the second rotatable member is formed of a polyimide resin, in which the sliding surface of the sliding member includes a glass cloth and a fluorocarbon resin with which the glass cloth is impregnated, and in which the lubricant is formed only of a fluoropolyether oil.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a fixing device including:

- a first rotatable member;
- a second rotatable member disposed in contact with the first rotatable member;
- a pressing member that is disposed on an inner circumferential surface of the second rotatable member and presses the inner circumferential surface of the second rotatable member such that the second rotatable member is pressed against the first rotatable member;
- a sliding member interposed between the inner circumferential surface of the second rotatable member and the pressing member; and
- a lubricant interposed between the inner circumferential surface of the second rotatable member and the sliding member,
- wherein the inner circumferential surface of the second rotatable member contains a resin having at least one group selected from the group consisting of an amido group, an imido group, a ketone group, and a sulfide group,
- wherein a sliding surface of the sliding member contains a heat resistant thermoplastic resin other than a fluorocarbon resin and a resin having a siloxane group that is other than the heat resistant thermoplastic resin, and
- wherein the lubricant contains an oil having a siloxane group in a main chain.

BRIEF DESCRIPTION OF THE DRAWINGS

An exemplary embodiment of the present disclosure will be described in detail based on the following figures, wherein.

DETAILED DESCRIPTION

Figure 1:
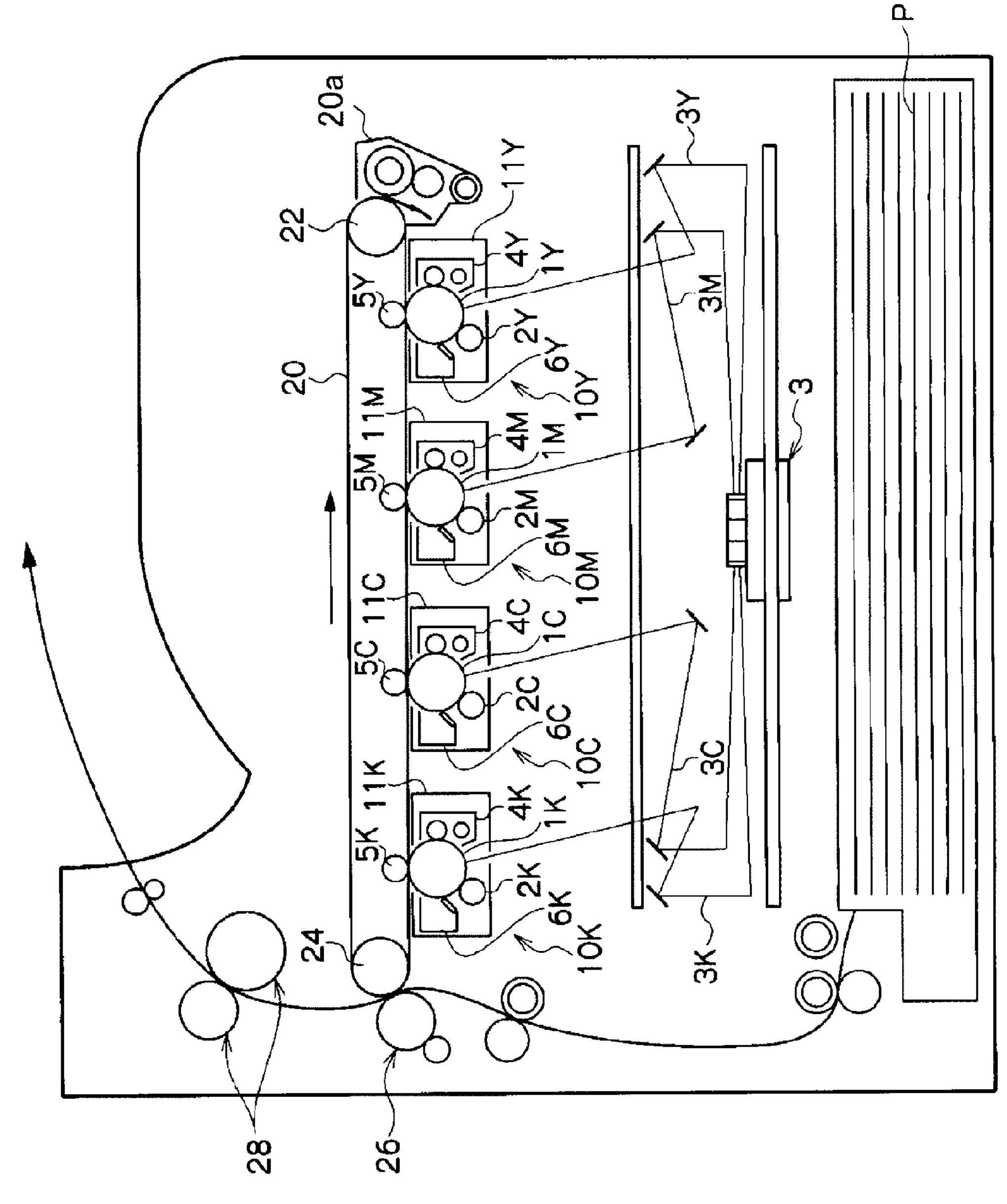
FIG. 1 is a schematic illustration showing an example of an image forming apparatus according to an exemplary embodiment.

An exemplary embodiment of the present disclosure will be described below. The following description and Examples are illustrative of the exemplary embodiment and are not intended to limit the scope of the present disclosure.

In a set of numerical ranges expressed in a stepwise manner in the present specification, the upper or lower limit in one numerical range may be replaced with the upper or lower limit in another numerical range in the set of numerical ranges. Moreover, in a numerical range described in the present specification, the upper or lower limit in the numerical range may be replaced with a value indicated in an Example.

Any component may contain a plurality of materials corresponding to the component.

When reference is made to the amount of a component in a composition, if the composition contains a plurality of materials corresponding to the component, the amount means the total amount of the plurality of materials in the composition, unless otherwise specified.

When the exemplary embodiment is described with reference to the drawings, components having substantially the same function are denoted by the same symbol throughout all the drawings, and their redundant description may be omitted.

Fixing Device/Image Forming Apparatus

A fixing device according to the exemplary embodiment is a specific fixing device including: a first rotatable member; a second rotatable member disposed in contact with the first rotatable member; a pressing member that is disposed on the inner circumferential surface of the second rotatable member and presses the inner circumferential surface of the second rotatable member such that the second rotatable member is pressed against the first rotatable member; a sliding member interposed between the inner circumferential surface of the second rotatable member and the pressing member; and a lubricant interposed between the inner circumferential surface of the second rotatable member and the sliding member.

The inner circumferential surface of the second rotatable member contains a resin having at least one group selected from the group consisting of an amido group, an imido group, a ketone group, and a sulfide group.

A sliding surface of the sliding member contains a heat resistant thermoplastic resin other than a fluorocarbon resin and a resin having a siloxane group that is other than the heat resistant thermoplastic resin.

The lubricant contains an oil having a siloxane group in a main chain.

An image forming apparatus according to the exemplary embodiment includes:

an image holding member;

a latent image forming device that forms a latent image on a surface of the image holding member;

a developing device that develops the latent image using a developer to form a toner image;

a transfer device that transfers the developed toner image onto a recording medium; and a fixing device that fixes the toner image to the recording medium.

The fixing device according to the present embodiment is applied to the image forming apparatus according to the exemplary embodiment.

With the fixing device and the image forming apparatus in the exemplary embodiment that have the structures described above, the increase in the rotational torque of the second rotatable member of the fixing device can be reduced, and an image with reduced unevenness in gloss can be formed. The reason for this may be as follows.

To form an image using a conventional electrophotographic image forming apparatus such as a printer, a copier, or a facsimile, first, a toner image is transferred onto a recording medium such as a recording paper sheet. Then the recording medium with the toner image transferred thereonto is heated and pressurized in a fixing device to thereby fix the toner image to the surface of the recording medium.

Various types of fixing devices have been proposed. One of them is the specific fixing device described above.

In the specific fixing device, a low-friction fluorocarbon resin having heat resistance is used for the sliding member. Specifically, the sliding member used is a fluorocarbon resin sheet, a sheet produced by weaving a fibrous fluorocarbon resin, or a sheet produced by impregnating a glass cloth with a fluorocarbon resin.

However, the fluorocarbon resin easily wears in a short time. Moreover, since the strength of the fluorocarbon resin is low, the fluorocarbon resin deforms significantly when a tensile or compressive force is applied. This causes an increase in the rotational torque of the second rotatable member.

Moreover, in the sheet produced by weaving the fibrous fluorocarbon resin and the sheet produced by impregnating the glass cloth with the fluorocarbon resin, irregularities are formed on their surface. Therefore, stress is concentrated on the protruding portions, and this causes unevenness in gloss in images obtained.

In the specific fixing device, the lubricant used is, for example, a PTFE grease containing a perfluoropolyether oil.

However, the affinity of the lubricant for the inner circumferential surface of the second rotatable member and for the sliding surface of the sliding member is low, and it is difficult for a thin film of the lubricant to be constantly interposed between the inner circumferential surface of the second rotatable member and the sliding surface of the sliding member. This also causes an increase in the rotational torque of the second rotatable member.

However, in the fixing device and the image forming apparatus according to the exemplary embodiment, at least one group selected from the group consisting of an amido group, an imido group, a ketone group, and a sulfide group is present on the inner circumferential surface of the second rotatable member. The inner circumferential surface of the second rotatable member on which any of these polar groups is present has a high affinity for the oil having a siloxane group in a main chain and used as the lubricant.

A siloxane group derived from the resin having the siloxane group is also present on the sliding surface of the sliding member. Therefore, the sliding surface of the sliding member also has a high affinity for the oil having a siloxane group in the main chain and used as the lubricant.

This allows the increase in the rotational torque of the second rotatable member to be reduced, and an image with reduced unevenness in gloss can be formed.

Moreover, since the sliding surface of the sliding member contains the heat resistant thermoplastic resin other than the fluorocarbon resin, the sliding member is less likely to wear in a short time. Therefore, the increase in the rotational torque of the second rotatable member can be reduced.

It can therefore be inferred that, in the fixing device and the image forming apparatus according to the exemplary embodiment, the increase in the rotational torque of the second rotatable member of the fixing device is reduced and an image with reduced unevenness in gloss can be formed.

An example of the image forming apparatus according to the exemplary embodiment will be described with reference to the drawings.

Figure 2:
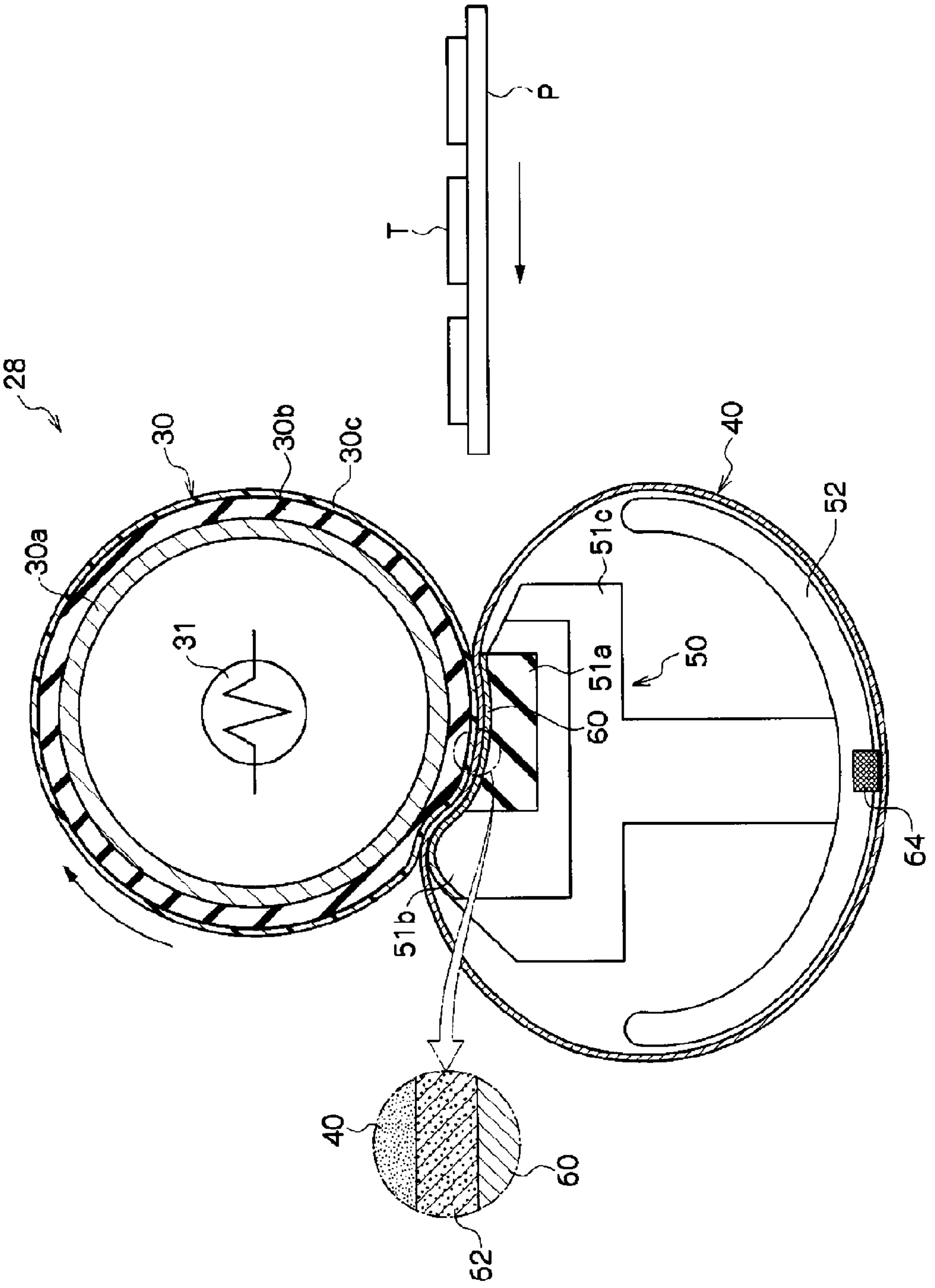
FIG. 2 is a schematic illustration showing an example of a fixing device according to the exemplary embodiment.

FIG. 1 is a schematic illustration showing an example of the image forming apparatus according to the exemplary embodiment. FIG. 2 is a schematic illustration showing an example of the fixing device according to the exemplary embodiment.

(Structure of Image Forming Apparatus)

As shown in FIG. 1, the image forming apparatus 100 according to the exemplary embodiment includes first to fourth electrophotographic process cartridges 10Y, 10M, 10C, and 10K (examples of an image forming unit) that output yellow (Y), magenta (M), cyan (C), and black (K) images, respectively, based on color-separated image data. These process cartridges 10Y, 10M, 10C, and 10K are arranged so as to be spaced apart from each other along the outer circumferential surface of an intermediate transfer belt 20. These process cartridges 10Y, 10M, 10C, and 10K are detachably attached to the image forming apparatus.

The intermediate transfer belt 20 serving as an intermediate transfer body is disposed above (in FIG. 1) the process cartridges 10Y, 10M, 10C, and 10K such that the outer circumferential surface of the intermediate transfer belt 20 faces the process cartridges. The intermediate transfer belt 20 is wound around a driving roller 22 and a support roller 24 that are disposed so as to be spaced apart from each other, the support roller 24 being in contact with the inner circumferential surface of the intermediate transfer belt 20. The intermediate transfer belt 20 is tensioned between these rollers and runs endlessly in a direction from the first process cartridge 10Y toward the fourth process cartridge 10K.

The support roller 24 is pressed by an unillustrated elastic member such as a spring in a direction away from the driving roller 22, and a tension is applied to the intermediate transfer belt 20 wound between these rollers. An intermediate transfer body cleaning device 20*a* is disposed on the outer circumferential surface of the intermediate transfer belt 20 so as to be opposed to the driving roller 22.

Since the first to fourth process cartridges 10Y, 10M, 10C, and 10K have substantially the same structure, the first process cartridge 10Y that is disposed on an upstream side in the running direction of the intermediate transfer belt and forms a yellow image will be described as a representative. The same portions of the second to fourth process cartridges 10M, 10C, and 10K as those in the first process cartridge 10Y are designated by the same reference symbols with the letter yellow (Y) replaced with magenta (M), cyan (C), and black (K), and their description will be omitted.

The first process cartridge 10Y includes a photoconductor 1Y serving as the image holding member. A charging roller (an example of a charging device) 2Y that charges the surface of the photoconductor 1Y to a prescribed potential, a developing device 4Y that supplies a charged toner contained in a developer to an electrostatic latent image to develop the electrostatic latent image, and a photoconductor cleaning device 6Y that removes the toner remaining on the surface of the photoconductor 1Y after first transfer are sequentially disposed around the photoconductor 1Y. These are disposed integrally in a housing 11Y (casing). In the second to fourth process cartridges 10M to 10K also, their components are disposed integrally in respective housings 11M to 11K (casings).

A first transfer roller 5Y (an example of a first transfer device) that transfers the developed toner image onto the intermediate transfer belt 20 and an exposure device 3 that irradiates the charged surface with a laser beam 3Y according to a color-separated image signal to form an electrostatic latent image are disposed together with the first process cartridge 10Y to thereby form an image forming unit.

The charging roller 2Y and the exposure device 3 correspond to an example of the latent image forming device.

The first transfer roller 5Y is disposed on the inner side of the intermediate transfer belt 20 and located at a position opposed to the photoconductor 1Y. Bias power sources (not shown) that apply first transfer biases are connected to the first transfer rollers 5Y, 5M, 5C, and 5K. Each bias power source is controlled by an unillustrated controller and changes the transfer bias applied to the corresponding first transfer roller.

(Structure of Fixing Device)

As shown in FIG. 2, the fixing device 28 includes a heating roller 30 (an example of the first rotatable member) and a pressing belt 40 (an example of the second rotatable member), and the heating roller 30 and the pressing belt 40 are disposed so as to be opposed to each other. The pressing belt 40 is pressed against the heating roller 30 by a pressing pad 50 (an example of the pressing member) disposed on the inner circumferential side of the pressing belt 40 and driven by a driving force received from the heating roller 30 along a belt running guide 52 while a contact portion is formed between the pressing belt 40 and the heating roller 30 that are in pressure contact with each other.

A sliding sheet 60 (an example of the sliding member) is interposed between the pressing belt 40 and the pressing pad 50. A lubricant 62 (an example of the lubricant) is interposed between the sliding sheet 60 and the inner circumferential surface of the pressing belt 40. The lubricant 62 is supplied to the inner circumferential surface of the pressing belt 40 from, for example, a lubricant supply member 64 disposed in a part of the belt running guide 52 so as to be interposed between the sliding sheet 60 and the inner circumferential surface of the pressing belt 40.

In FIG. 2, T represents a toner image.

Heating Roller 30 (Example of First Rotatable Member)

The heating roller 30 includes a hollow metal core 30*a* including a heat source 31 such as a halogen lamp disposed thereinside and further includes an elastic layer 30*b* and a release layer 30*c* that are formed in this order on the metal core 30*a*.

The metal core 30*a* is formed from a cylindrical body made of a metal such as aluminum or stainless steel. The elastic layer 30*b* is made of, for example, an HTV silicone rubber or a fluorocarbon rubber (having a JIS-A rubber hardness of about 45 degrees, the rubber hardness being measured using an A-type hardness meter of the spring type manufactured by Teclock Corporation under a load of 1,000 gf according to JIS K6301) and has a thickness of from about 2 mm to about 5 mm. The release layer 30*c* is made of, for example, a fluorocarbon rubber, a silicone rubber, or a fluorocarbon resin and has a thickness of from 20 μm to 50 μm inclusive. Of course, these are not limitations, and well-known materials may be used.

The heating roller 30 serves as a fixing roller and is driven to rotate such that its peripheral speed is adjusted to, for example, 260 mm/sec by an unillustrated driving source.

The outer diameter of the heating roller 30 is generally, for example, from about 25 mm to about 80 mm.

The surface temperature of the heating roller 30 is detected by an unillustrated temperature sensor in contact with its surface and controlled to, for example, 175° C. by an unillustrated control circuit.

Pressing Belt 40 (Example of Second Rotatable Member)

The pressing belt 40 is formed such that its inner circumferential surface contains a resin having at least one group selected from the group consisting of an amido group, an imido group, a ketone group, and a sulfide group. This resin is a heat resistant resin. The term "heat resistant" means that the resin does not melt or decompose even when its temperature reaches the heating temperature (e.g., the fixing temperature) of the fixing device. The same applies to the following.

Specifically, the pressing belt 40 includes a resin base layer that forms its inner circumferential surface and that contains a resin having at least one group selected from the group consisting of an amido group, an imido group, a ketone group, and a sulfide group.

The pressing belt 40 may be a single layer body composed of the resin base layer forming the inner circumferential surface of the pressing belt 40, a layered body composed of the resin base layer forming the inner circumferential surface of the pressing belt 40, an elastic layer disposed on the resin base layer, and a release layer disposed on the elastic layer, or a layered body composed of the resin base layer forming the inner circumferential surface of the pressing belt 40 and a release layer disposed on the resin base layer.

The resin base layer will be described.

Specific examples of the resin having at least one group selected from the group consisting of an amido group, an imido group, a ketone group, and a sulfide group include polyimide resins, polyamide-imide resins, polyether ether ketone resins, polyphenylene sulfide resins, polyethersulfone resins, polysulfone resins, and polyphenylsulfone resins.

In particular, the resin is preferably at least one selected from the group consisting of polyimide resins, polyamide-imide resins, polyether ether ketone resins, and polyphenylene sulfide resins and more preferably a polyimide resin.

These resins (in particular, polyimide resins) have high wear resistance and a high affinity for the lubricant. Therefore, the increase in the rotational torque of the pressing belt 40 can be easily reduced.

Examples of the polyimide resins include imidized products of polyamic acids (precursors of polyimide resins) that are polymers of tetracarboxylic dianhydrides and diamine compounds.

Examples of the polyimide resins include resins having a structural unit represented by the following general formula (I).

General formula (I)

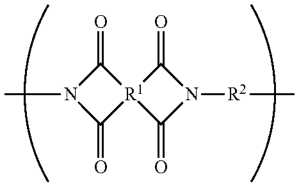

In general formula (I), $R^1$ represents a tetravalent organic group, and $R^2$ represents a divalent organic group.

Examples of the tetravalent organic group represented by $R^1$ include aromatic groups, aliphatic groups, alicyclic groups, combinations of aromatic and aliphatic groups, and substituted groups thereof. Specific examples of the tetravalent organic group include residues of tetracarboxylic dianhydrides described later.

Examples of the divalent organic group represented by $R^2$ include aromatic groups, aliphatic groups, alicyclic groups, combinations of aromatic and aliphatic groups, and substituted groups thereof. Specific examples of the divalent organic group include residues of diamine compounds described later.

Specific examples of the tetracarboxylic dianhydride used as a raw material of the polyimide resin include pyromellitic dianhydride, 3,3',4,4'-benzophenonetetracarboxylic dianhydride, 3,3',4,4'-biphenyltetracarboxylic dianhydride, 2,3,3',4-biphenyltetracarboxylic dianhydride, 2,3,6,7-naphthalenetetracarboxylic dianhydride, 1,2,5,6-naphthalenetetracarboxylic dianhydride, 1,4,5,8-naphthalenetetracarboxylic dianhydride, 2,2'-bis(3,4-dicarboxyphenyl)sulfonic dianhydride, perylene-3,4,9,10-tetracarboxylic dianhydride, bis(3,4-dicarboxyphenyl)ether dianhydride, and ethylenetetracarboxylic dianhydride.

Specific examples of the diamine compound used as a raw material of the polyimide resin include 4,4'-diaminodiphenyl ether, 4,4'-diaminodiphenylmethane, 3,3'-diaminodiphenylmethane, 3,3'-dichlorobenzidine, 4,4'-diaminodiphenyl sulfide, 3,3'-diaminodiphenylsulfone, 1,5-diaminonaphthalene, m-phenylenediamine, p-phenylenediamine, 3,3'-dimethyl-4,4'-biphenyldiamine, benzidine, 3,3'-dimethylbenzidine, 3,3'-dimethoxybenzidine, 4,4'-diaminodiphenylsulfone, 4,4'-diaminodiphenylpropane, 2,4-bis(β-amino-tert-butyl)toluene, bis(p-β-amino-tert-butylphenyl)ether, bis(p-β-methyl-δ-aminophenyl)benzene, bis-p-(1,1-dimethyl-5-amino-pentyl)benzene, 1-isopropyl-2,4-m-phenylenediamine, m-xylylenediamine, p-xylylenediamine, di(p-aminocyclohexyl)methane, hexamethylenediamine, heptamethylenediamine, octamethylenediamine, nonamethylenediamine, decamethylenediamine, diaminopropyltetramethylene, 3-methylheptamethylenediamine, 4,4-dimethylheptamethylenediamine, 2,11-diaminododecane, 1,2-bis-3-aminopropoxyethane, 2,2-dimethylpropylenediamine, 3-methoxyhexamethylenediamine, 2,5-dimethylheptamethylenediamine, 3-methylheptamethylenediamine, 5-methylnonamethylenediamine, 2,17-diaminoeicosadecane, 1,4-diaminocyclohexane, 1,10-diamino-1,10-dimethyldecane, 12-diaminooctadecane, 2,2-bis[4-(4-aminophenoxy)phenyl]propane, piperazine, $H_2N(CH_2)_3O(CH_2)_2O(CH_2)NH_2$, $H_2N(CH_2)_3S(CH_2)_3NH_2$, and $H_2N(CH_2)_3N(CH_3)_2(CH_2)_3NH_2$.

Examples of the polyamide-imide resin include resins having a repeating unit including an imide bond and an amide bond.

More specific examples of the polyamide-imide resin include a polymer of a trivalent carboxylic acid compound (referred to also as a tricarboxylic acid) having an acid anhydride group with a diisocyanate compound or a diamine compound.

The tricarboxylic acid may be trimellitic anhydride or a derivative thereof. The tricarboxylic acid may be used in combination with a tetracarboxylic dianhydride, an aliphatic dicarboxylic acid, an aromatic dicarboxylic acid, etc.

Examples of the diisocyanate compound include 3,3'-dimethylbiphenyl-4,4'-diisocyanate, 2,2'-dimethylbiphenyl-4,4'-diisocyanate, biphenyl-4,4'-diisocyanate, biphenyl-3,3'-diisocyanate, biphenyl-3,4'-diisocyanate, 3,3'-diethylbiphenyl-4,4'-diisocyanate, 2,2'-diethylbiphenyl-4,4'- diisocyanate, 3,3'-dimethoxybiphenyl-4,4'-diisocyanate, 2,2'-dimethoxybiphenyl-4,4'-diisocyanate, naphthalene-1,5-diisocyanate, and naphthalene-2,6-diisocyanate.

Examples of the diamine compound include compounds that have structures similar to the structures of the above isocyanates and have amino groups instead of the isocyanato groups.

The resin base layer may contain, in addition to the resin, additional components. Examples of the additional components include a conducting agent, a filler for improving mechanical strength, an antioxidant for preventing thermal deterioration, a surfactant, and a heat resistant antioxidant.

In the above example, the first rotatable member is the heating roller, and the second rotatable member is the pressing belt. However, in another embodiment, the first rotatable member may be a pressing roller, and the second rotatable member may be a heating belt.

When the first rotatable member is a pressing roller, the structure of the pressing roller may be the same as the structure of the heating roller 30 described above.

When the second rotatable member is a heating belt, the structure of the heating belt may be the same as the structure of the pressing belt 40 described above.

In particular, when the second rotatable member is a heating belt, the heating belt may be a single layer body composed of a resin base layer forming the inner circumferential surface of the heating belt, a layered body including the resin base layer forming the inner circumferential surface of the heating belt, an elastic layer disposed on the resin base layer, and a release layer disposed on the elastic layer, a layered body including the resin base layer forming the inner circumferential surface of the heating belt and a release layer disposed on the resin base layer, or a layered body including the resin base layer forming the inner circumferential surface of the heating belt, a metal layer disposed on the resin base layer, an elastic layer disposed on the metal base layer, and a release layer disposed on the elastic layer. The elastic layer will be described.

The elastic layer contains a heat resistant elastic material.

Examples of the heat resistant elastic material include silicone rubber and fluorocarbon rubber.

Examples of the silicone rubber include RTV (Room Temperature Vulcanizing) silicone rubber, HTV (High Temperature Vulcanizing) silicone rubber, and liquid silicone rubber. Specific examples include polydimethyl silicone rubber, methylvinyl silicone rubber, methylphenyl silicone rubber, and fluorosilicone rubber.

Examples of the fluorocarbon rubber include vinylidene fluoride-based rubber, tetrafluoroethylene/propylene-based rubber, tetrafluoroethylene/perfluoromethyl vinyl ether rubber, phosphazene-based rubber, and fluoropolyether.

The elastic layer may contain additional components. Examples of the additional components include a filler, a conducting agent, a softener (such as a paraffin-based softener), a processing aid (such as stearic acid), an antioxidant (such as an amine-based antioxidant), a vulcanizing agent (sulfur, a metal oxide, a peroxide, etc.), and a functional filler (such as alumina).

The release layer will be described.

The release layer contains, for example, a heat resistant release material.

Examples of the heat resistant release material include fluorocarbon rubber, fluorocarbon resins, silicone resins, and polyimide resins.

In particular, the heat resistant release material may be a fluorocarbon resin. Specific examples of the fluorocarbon resin include: polytetrafluoroethylene (PTFE); and tetrafluoroethylene-perfluoroalkyl vinyl ether copolymers (PFA) such as tetrafluoroethylene-perfluoromethyl vinyl ether copolymers (MFA), tetrafluoroethylene-perfluoroethyl vinyl ether copolymers (EFA), and tetrafluoroethylene-perfluoropropyl vinyl ether copolymers. Other examples include tetrafluoroethylene-hexafluoropropylene copolymers (FEP), ethylene-tetrafluoroethylene copolymers (ETFE), polyvinylidene fluoride (PVDF), polychlorotrifluoroethylene (PCTFE), and polyvinyl fluoride (PVF).

Of these, polytetrafluoroethylene (PTFE) and tetrafluoroethylene-perfluoroalkyl vinyl ether copolymers (PFA) such as tetrafluoroethylene-perfluoromethyl vinyl ether copolymers (MFA) and tetrafluoroethylene-perfluoroethyl vinyl ether copolymers (EFA) may be used in terms of heat resistance, mechanical properties, etc.

The thickness of the release layer is set to preferably 5 μm to 100 μm and more preferably 10 μm to 30 μm.

Pressing Pad 50 (Example of Pressing Member)

The pressing pad 50 includes two pressing members 51*a* and 51*b* having different hardnesses and arranged in the traveling direction of a recording medium P. The pressing member 51*a* on the recording medium P insertion side of the pressing pad 50 is formed from a rubber-like elastic member, and the pressing member 51*b* on the recording medium P discharge side is formed from a hard pressure-applying member such as a metal, so that the pressure in the contact region is higher on the recording medium P discharge side than on the recording medium P insertion side. The pressing member 51*a* and 51*b* are supported by a holder 51*c*, press the inner circumferential surface of the pressing belt 40 via the sliding sheet 60 (an example of the sliding member), and thus press the heating roller 30.

Sliding Sheet 60 (Example of Sliding Member)

The sliding sheet 60 is formed such that its sliding surface contains a heat resistant thermoplastic resin other than the fluorocarbon resin and a resin having a siloxane group that is other than the heat resistant thermoplastic resin.

Specifically, the sliding sheet 60 is formed as a single layer body including a resin base layer containing a heat resistant thermoplastic resin other than the fluorocarbon resin and a resin having a siloxane group that is other than the heat resistant thermoplastic resin. More specifically, the sliding sheet 60 is a resin sheet containing these components. Therefore, its surface is less irregular, and unevenness in gloss of an image caused by stress concentration on protruding portions is reduced.

The sliding sheet 60 may be a layered body including the resin base layer forming the sliding surface and another layer disposed on the side opposite to the sliding surface of the resin base layer.

Examples of the heat resistant thermoplastic resin include polyether ether ketone resins, polyphenylene sulfide resins, polyetherimide resins, polyphenylsulfone resins, polyethersulfone resins, and polysulfone resins.

In particular, the heat resistant thermoplastic resin is preferably at least one resin selected from the group consisting of polyether ether ketone resins, polyphenylene sulfide resins, polyetherimide resins, and polyphenylsulfone resins and more preferably at least one resin selected from the group consisting of polyether ether ketone resins and polyphenylene sulfide resins.

These resins (in particular, polyether ether ketone resins and polyphenylene sulfide resins) may be used because of their high wear resistance, high toughness, and high elastic modulus.

Examples of the resin having a siloxane group include resins having a polysiloxane structure in their main or side chain.

Specific examples of the resin having a siloxane group include thermosetting silicone resin particles, silicone oil gums, silicone elastomers, and siloxane-modified polyetherimides.

In particular, the resin having a siloxane group may be at least one selected from the group consisting of thermosetting silicone resin particles and silicone oil gums. These components have a high affinity, in particular, for the lubricant. This more easily allows the increase in the rotational torque of the pressing belt 40 to be reduced.

The thermosetting silicone resin particles are silicone resin particles that are hardened by heat and have rubber-like elasticity. The thermosetting silicone resin particles may be unmodified thermosetting silicone resin particles. In this case, the affinity for the lubricant is high, and this more easily allows the increase in the rotational torque of the pressing belt 40 to be reduced.

The silicone oil gum is a silicone oil having a molecular weight of 300000 or more and formed into pellets.

The content of the resin having a siloxane group is preferably from 1.0% by mass to 20.0% by mass inclusive, more preferably from 2.0% by mass to 15.0% by mass inclusive, and still more preferably from 5.0% by mass to 10.0% by mass inclusive based on the mass of the heat resistant thermoplastic resin.

When the content of the resin having a siloxane group is in the above range, the affinity for the lubricant can be increased while the wear resistance of the sliding sheet 60 is maintained, and this more easily allows the increase in the rotational torque of the pressing belt 40 to be reduced.

The resin base layer forming the sliding surface may contain, in addition to the resin, additional components. Examples of the additional components include a conducting agent, a filler for improving mechanical strength, an antioxidant for preventing thermal deterioration, a surfactant, and a heat resistant antioxidant.

Lubricant 62 (Example of Lubricant)

The lubricant 62 contains an oil having a siloxane group in its main chain.

The oil having a siloxane group in its main chain is an oil having a polysiloxane structure in the main chain, and examples thereof include silicone oils and various modified silicone oils.

The oil having a siloxane group in the main chain may be an oil having a structure having a polar group in a side chain. When the oil has a polar group, the affinity for the inner circumferential surface of the pressing belt 40 is high, and this more easily allows the increase in the rotational torque of the pressing belt 40 to be reduced.

Examples of the polar group include an amino group, a hydroxyl group, a carboxyl group, a sulfonic acid group, a phenyl group, an epoxy group, a mercapto group, a methacrylic group, a phenol group, a polyether group, and a fluorine group. In particular, the polar group may be an amino group because its affinity for the inner circumferential surface of the pressing belt 40 is high and this more easily allows the increase in the rotational torque of the pressing belt 40 to be reduced.

Specific examples of the lubricant 62 include modified oils such as alkyl-modified silicone oils (e.g., dimethyl-modified silicone oils), amino-modified silicone oils, methylphenyl-modified silicone oils, epoxy-modified silicone oils, phenol-modified silicone oils, polyether-modified silicone oils, and fluorine-modified silicone oils.

In particular, the lubricant 62 may be an amino-modified silicone oil because its affinity for the inner circumferential surface of the pressing belt 40 is high and this more easily allows the increase in the rotational torque of the pressing belt 40 to be reduced.

The lubricant 62 may contain, in addition to the oil, additional components. Examples of the additional components include a grease (such as silicon grease), a heat transfer agent, an antioxidant, a surfactant, silicone particles, an organic metal salt, and a hindered amine.

Image Forming Operations of Image Forming Apparatus

The image forming operations of the image forming apparatus according to the exemplary embodiment will be described. The operation for forming a yellow image in the first process cartridge 10Y will be described as a representative image forming operation.

First, before the image forming operation, the charging roller 2Y charges the surface of the photoconductor 1Y to a potential of, for example, from about −600 V to about −800 V.

The photoconductor 1Y is formed, for example, by stacking a photosensitive layer on an electrically conductive base. The resistance of the photosensitive layer is generally high. One property of the photosensitive layer is that, when the photosensitive layer is irradiated with the laser beam 3Y, the specific resistance of the portion irradiated with the laser beam is changed. Therefore, the laser beam 3Y is outputted through the exposure device 3 onto the charged surface of the photoconductor 1Y according to yellow image data sent from an unillustrated controller. The photosensitive layer on the surface of the photoconductor 1Y is irradiated with the laser beam 3Y, and an electrostatic latent image having a yellow print pattern is thereby formed on the surface of the photoconductor 1Y.

The electrostatic latent image formed on the photoconductor 1Y as described above is rotated to a developing position as the photoconductor 1Y runs. The electrostatic latent image on the photoconductor 1Y is visualized at the developing position by the developing device 4Y (a toner image is formed).

The developing device 4Y houses a developer containing, for example, a yellow toner and a carrier. The yellow toner is agitated in the developing device 4Y and thereby frictionally charged. The charged yellow toner has a charge with the same polarity (negative polarity) as the charge on the photoconductor 1Y. As the surface of the photoconductor 1Y passes through the developing device 4Y, the yellow toner electrostatically adheres only to charge-eliminated latent image portions on the surface of the photoconductor 1Y, and the latent image is thereby developed with the yellow toner. Then the photoconductor 1Y with the yellow toner image formed thereon continues running, and the toner image developed on the photoconductor 1Y is transported to a prescribed first transfer position.

When the yellow toner image on the photoconductor 1Y is transported to the first transfer position, a first transfer bias is applied to the first transfer roller 5Y, and an electrostatic force directed from the photoconductor 1Y toward the first transfer roller 5Y acts on the toner image, so that the toner image on the photoconductor 1Y is transferred onto the intermediate transfer belt 20. The transfer bias applied in this case has a (+) polarity opposite to the (−) polarity of the toner and is controlled to, for example, about +10 μA in the first process cartridge 10Y by the controller (not shown).

The first transfer biases applied to the first transfer rollers 5M, 5C, and 5K of the second process cartridge 10M and subsequent process cartridges are controlled in the same manner as that for the first process cartridge.

The intermediate transfer belt 20 with the yellow toner image transferred thereon in the first process cartridge 10Y is sequentially transported through the second to fourth process cartridges 10M, 10C, and 10K, and toner images of respective colors are superimposed and multi-transferred.

Then the intermediate transfer belt 20 with all the color toner images multi-transferred thereon in the first to fourth process cartridges reaches a second transfer portion that is composed of the intermediate transfer belt 20, the support roller 24 in contact with the inner circumferential surface of the intermediate transfer belt 20, and a second transfer roller (an example of a second transferring device) 26 disposed on the image holding surface side of the intermediate transfer belt 20. A recording medium P is supplied to a gap between the secondary transfer roller 26 and the intermediate transfer belt 20 through a supply mechanism, and a second transfer bias is applied to the support roller 24. The transfer bias applied in this case has the same polarity (−) as the polarity (−) of the toner, and an electrostatic force directed from the intermediate transfer belt 20 toward the recording medium P acts on the toner image, so that the toner image on the intermediate transfer belt 20 is transferred onto the recording medium P. In this case, the second transfer bias is determined according to a resistance detected by resistance detection means (not shown) for detecting the resistance of the second transfer portion and is constant-voltage-controlled.

The intermediate transfer belt 20, the first transfer roller 5Y, and the second transfer roller 26 correspond to an example of the transfer device.

Then the recording medium P is fed to the fixing device 28 and inserted into a contact region in which the heating roller 30 rotated in the direction indicated by an arrow and the pressing belt 40 are in pressure contact with each other. In this case, the recording medium P is inserted such that the surface of the recording medium P on which the unfixed toner image has been formed and the surface of the heating roller 30 face each other. As the recording medium P passes through the contact region, heat and pressure are applied to the recording medium P, and the unfixed toner image is fixed to the recording medium P. The recording medium after the fixation passes through the contact region, then separated from the heating roller 30, and discharged from the fixing device 28.

The fixation processing is performed as described above, and the image is permanently fixed to the recording medium P. The recording medium P with the color image fixed thereon is transported to an ejection portion, and a series of the color image formation operations is thereby completed.

EXAMPLES

Examples will next be described. However, the present disclosure is not at all limited to these Examples. In the following description, "parts" and "%" are based on mass, unless otherwise specified.

<Production of Pressing Belts>

(Production of Pressing Belt (1))

The surface of an aluminum-made circular cylindrical core body with irregularities formed thereon by shot blasting is coated with a silicone-based release agent, and the coating is subjected to baking treatment at 300° C. for 1 hour. Then the resulting surface is dip-coated with an N-methylpyrrolidone solution of a polyimide (PI) precursor, and the coating is dried at 100° C. for 1 hour. A resin base layer forming the inner circumferential surface of a pressing belt is thereby formed.

Next, the outer circumferential surface of the resin base layer is coated with a fluorocarbon resin dispersion (specifically, a PTFE dispersion), and the coating is dried at 60° C. for 10 minutes in a firing furnace, gradually heated to 380° C., fired for 20 minutes, and cooled to room temperature to thereby form a release layer.

Then the resin base layer with the release layer formed thereon is pulled out of the core body and cut to a desired size using a cutter to thereby obtain a pressing belt (1).

(Production of Pressing Belt (2))

The surface of an aluminum-made circular cylindrical core body with irregularities formed thereon by shot blasting is coated with a silicone-based release agent, and the coating is subjected to baking treatment at 300° C. for 1 hour. Then the resulting surface is dip-coated with a varnish prepared by dissolving a polyamide-imide resin in N-methylpyrrolidone, and the coating is dried at 120° C. for 1 hour. A resin base layer forming the inner circumferential surface of a pressing belt is thereby formed.

Next, the outer circumferential surface of the resin base layer is coated with a fluorocarbon resin dispersion (specifically, a PTFE dispersion), and the coating is dried at 60° C. for 10 minutes in a firing furnace, gradually heated to 320° C., fired for 20 minutes, and cooled to room temperature to thereby form a release layer.

Then the resin base layer with the release layer formed thereon is pulled out of the core body and cut to a desired size using a cutter to thereby obtain a pressing belt (2).

(Production of Pressing Belt (3))

Polyether ether ketone (PEEK) resin pellets (450G manufactured by Victrex) are fed to a material supply hopper in a single screw extruder. The temperature of a barrel is set to 360° C., and the temperature of a tubular die from which the resin is discharged is set to 380° C. The resin is melted and extruded while the extruded resin is withdrawn by a withdrawing machine Immediately after the extrusion, the inner circumferential surface of the cylindrical molten resin is brought into contact with the surface of a 30 mm cylindrical sizing die, and cooling air is blown onto the outer circumferential surface to cool the resin. The resulting cooled film is drawn into a cylindrical shape and cut using a cutter, and a pressing belt (3) is thereby obtained.

(Production of Pressing Belt (4))

Polyphenylene sulfide (PPS) resin pellets (A900 manufactured by TORAY INDUSTRIES Inc.) are fed to a material supply hopper in a single screw extruder. The temperature of a barrel is set to 260° C., and the temperature of a tubular die from which the resin is discharged is set to 300° C. The resin is melted and extruded while the extruded resin is withdrawn by a withdrawing machine. Immediately after the extrusion, the inner circumferential surface of the cylindrical molten resin is brought into contact with the surface of a 30 mm cylindrical sizing die, and cooling air is blown onto the outer circumferential surface to cool the resin. The resulting cooled film is drawn into a cylindrical shape and cut using a cutter, and a pressing belt (4) is thereby obtained.

(Production of Pressing Belt (C1))

A 50 μm-thick SUS metal sleeve manufactured by Endo Manufacturing Co., Ltd. is used, and a fluorocarbon resin layer serving as a surface layer is provided on the SUS metal sleeve to thereby obtain a pressing belt (C1).

<Production of Sliding Sheets>

(Production of Sliding Sheet (1))

A polyether ether ketone (PEEK) resin (Victrex 450G (manufactured by Victrex)) is heated to 380° C. and melted in a twin-screw extrusion melt kneader (twin-screw melt kneading extruder L/D60 (manufactured by PARKER CORPORATION)). Ten parts by mass of unmodified thermosetting silicone resin particles ("KMP590" (manufactured by Shin-Etsu Chemical Co., Ltd.)) are supplied to 100 parts by mass of the molten PEEK resin from a side portion of the kneader using a side feeder, and the mixture is melted and kneaded. The kneaded molten mixture is placed in a water bath to cool and solidify the mixture, and the resulting mixture is cut to a desired size to thereby obtain resin mixture pellets containing the silicone resin particles.

The obtained resin mixture pellets are fed to a single-screw extruder, and the molten resin mixture is extruded from a T die (melt discharge gap: 200 μm) heated to 380° C. into a sheet shape. The sheet is wound around a cooling roller at 190° C. to cool the sheet. The cooled sheet is caused to pass between a roller heated to 250° C. and having a 100 mesh SUS metal net wound around the surface of the roller and a roller with a heat resistant silicone rubber disposed on its surface to transfer the shape of the metal net under a pressure of 40 MPa, and a sheet having irregularities is thereby obtained. The sheet having irregularities is cut into a prescribed size to thereby obtain a sliding sheet (1).

(Production of Sliding Sheet (2))

A sliding sheet (2) is obtained in the same manner as that for the sliding sheet (1) except that the amount of the unmodified thermosetting silicone resin particles ("KMP590" (manufactured by Shin-Etsu Chemical Co., Ltd.)) is changed to 15 parts by mass.

(Production of Sliding Sheet (3))

A sliding sheet (3) is obtained in the same manner as that for the sliding sheet (1) except that 5 parts by mass of silicone gum ("GENIOPLAST" manufactured by Wacker Asahikasei Silicone Co., Ltd.) is used instead of the unmodified thermosetting silicone resin particles ("KMP590" (manufactured by Shin-Etsu Chemical Co., Ltd.)).

(Production of Sliding Sheet (4))

A polyphenylene sulfide (PPS) resin (TORELINA A900 (manufactured by TORAY INDUSTRIES Inc.)) is heated to 300° C. and melted in a twin-screw extrusion melt kneader (twin-screw melt kneading extruder L/D60 (manufactured by PARKER CORPORATION)). Ten parts by mass of unmodified thermosetting silicone resin particles ("KMP590" (manufactured by Shin-Etsu Chemical Co., Ltd.)) are supplied to 100 parts by mass of the molten PPS resin from a side portion of the kneader using a side feeder, and the mixture is melted and kneaded. The kneaded molten mixture is placed in a water bath to cool and solidify the mixture, and the resulting mixture is cut to a desired size to thereby obtain resin mixture pellets containing the silicone resin particles.

The obtained resin mixture pellets are fed to a single-screw extruder, and the molten resin mixture is extruded from a T die (melt discharge gap: 200 μm) heated to 300° C. into a sheet shape. The sheet is wound around a cooling roller at 160° C. to cool the sheet. The cooled sheet is caused to pass between a roller heated to 250° C. and having a 100 mesh SUS metal net wound around the surface of the roller and a roller with a heat resistant silicone rubber disposed on its surface to transfer the shape of the metal net under a pressure of 40 MPa, and a sheet having irregularities is thereby obtained. The sheet having irregularities is cut into a prescribed size to thereby obtain a sliding sheet (4).

(Production of Sliding Sheet (5))

A sliding sheet (5) is obtained in the same manner as that for the sliding sheet (1) except that the amount of the silicone resin particles ("KMP590" (manufactured by Shin-Etsu Chemical Co., Ltd.)) is changed to 20 parts by mass.

(Production of Sliding Sheet (6))

A polyetherimide (PEI) resin (ULTEM 1000 manufactured by SABIC) is heated to 340° C. and melted in a twin-screw extrusion melt kneader (twin-screw melt kneading extruder L/D60 (manufactured by PARKER CORPORATION)). Ten parts by mass of unmodified thermosetting silicone resin particles ("KMP590" (manufactured by Shin-Etsu Chemical Co., Ltd.)) are supplied to 100 parts by mass of the molten PEI resin from a side portion of the kneader using a side feeder, and the mixture is melted and kneaded. The kneaded molten mixture is placed in a water bath to cool and solidify the mixture, and the resulting mixture is cut to a desired size to thereby obtain resin mixture pellets containing the silicone resin particles.

The obtained resin mixture pellets are fed to a single-screw extruder, and the molten resin mixture is extruded from a T die (melt discharge gap: 200 μm) heated to 300° C. into a sheet shape. The sheet is wound around a cooling roller at 160° C. to cool the sheet. The cooled sheet is caused to pass between a roller heated to 180° C. and having a 100 mesh SUS metal net wound around the surface of the roller and a roller with a heat resistant silicone rubber disposed on its surface to transfer the shape of the metal net under a pressure of 40 MPa, and a sheet having irregularities is thereby obtained. The sheet having irregularities is cut into a prescribed size to thereby obtain a sliding sheet (6).

(Production of Sliding Sheet (7))

A sliding sheet (7) is obtained in the same manner as that for the sliding sheet (1) except that modified thermosetting silicone resin particles ("R200" manufactured by Shin-Etsu Chemical Co., Ltd.) are used instead of the unmodified thermosetting silicone resin particles ("KMP590" (manufactured by Shin-Etsu Chemical Co., Ltd.)).

(Sliding Sheets (8) to (11))

Sliding sheets (8) to (11) are obtained in the same manner as that for the sliding sheet (1) except that the amount of the unmodified thermosetting silicone resin particles ("KMP590" (manufactured by Shin-Etsu Chemical Co., Ltd.)) is changed to 0.5 parts by mass, 1.0 parts by mass, 20 parts by mass, or 25 parts by mass.

(Production of Sliding Sheet (C1): Using PTFE)

A polytetrafluoroethylene (PTFE) resin sintered body is subjected to skiving (the resin is skived with a shape edge into a thin film) to a thickness of 200 μm, and a sliding sheet (C1) is thereby obtained.

(Production of Sliding Sheet (C2): Sheet Including Glass Cloth Impregnated With Fluorocarbon Resin)

A glass cloth is impregnated with a PTFE resin dispersion, dried at 150° C., heated and fired at 380° C., and cooled. Specifically, the glass cloth sheet impregnated with the fluorocarbon resin (product name: FGF400) manufactured by CHUKOH CHEMICAL INDUSTRIES, LTD. is used as a sliding sheet (C2).

<Lubricants>

Lubricant (1): dimethyl silicone oil (product name: "KF96" manufactured by Shin-Etsu Chemical Co., Ltd.)

Lubricant (2): amino-modified silicone oil (product name "KF8009" manufactured by Shin-Etsu Chemical Co., Ltd.)

Lubricant (3): dimethyl silicone oil-containing silicon grease ("G503" manufactured by Shin-Etsu Chemical Co., Ltd.)

Lubricant (C1): fluoropolyether oil ("DEMNUM S100" manufactured by DAIKIN INDUSTRIES, Ltd.)

Lubricant (C2): Fluoropolyether oil-containing PTFE grease ("HP300" manufactured by Du Pont-Mitsui Fluorochemicals Co. Ltd.)

Examples 1 to 15 and Comparative Examples 1 to 3

The pressing belts, the sliding sheets, and the lubricants are combined as shown in Table 1, and one of the combinations is attached to an image forming apparatus obtained by modifying "APEOS PORT Print C5570" manufactured by FUJIFILM Business Innovation Corp.

Each apparatus is used as an image forming apparatus in the corresponding Example, and the following evaluation is performed.

Evaluation (Increase in Torque of Pressing Belt)

The increase in the torque of the pressing belt is measured as follows.

A measurement gear of a direct torque meter (a device produced in FUJIFILM Business Innovation Corp.) is engaged with a gear portion of the fixing roller, and the torque required for initial driving of the fixing roller and the torque required for driving the fixing roller after a lapse of time are measured (unit: Nm). The increase in the driving torque of the fixing roller is evaluated as the increase in the torque of the pressing belt.

If the increase in the driving torque is excessively large, an excessive load is applied to a driving gear of the fixing roller serving as a driving source, and this causes a practical problem. In particular, examples of a problematic phenomenon include occurrence of wrinkles in a paper sheet on which an image is formed and abnormal sounds coming from the gear.

In the Comparative Examples, the number of outputted sheets (kPV=1000×the number of outputted sheets) at the time of the occurrence of the increase in the driving torque is shown.

(Paper Wrinkling)

Paper wrinkling is measured as follows.

Ten blank sheets are continuously outputted, and 10 sheets with a solid image (solid blue image, density: 100%) printed on the back side are continuously outputted. The occurrence of deformation of the discharged sheets and the occurrence of wrinkling of the sheets are checked.

The deformation and wrinkling are evaluated according to the following criteria.

A: The deformation and wrinkling of the sheets are not found.

B: The deformation and wrinkling of the sheets are found.

In the Comparative Examples, the number of outputted sheets (denoted using PV in the table) at the time of the occurrence of deformation and wrinkling of a sheet is shown.

(Image Disturbance)

Image disturbance is measured as follows.

A lattice-shaped chart image is formed. Then whether image disturbance caused by scattering of the toner forming the line image has occurred in the line image is checked using a magnifying microscope, and the image quality is evaluated by visual inspection.

The image disturbance is evaluated according to the following criterial.

A: No image disturbance due to scattering of the toner is found in the line image.

B: Slight scattering of the toner is found in the line image under the magnifying microscope but does not cause any problem by visual inspection.

C: Significant scattering of the toner is found in the line image, and image disturbance is found.

In the Comparative Examples, the number of outputted sheets (denoted using PV in the table) at the time of the occurrence of image disturbance is shown.

(Unevenness in Gloss)

Unevenness in gloss is measured as follows.

A 100% solid blue image is formed, and unevenness in gloss is evaluated by visual inspection. When the difference in gloss in the image measured by a Gardner gloss meter (incident angle: 60°) is 5° or less, the unevenness does not cause any practical problem.

The unevenness in gloss is evaluated according to the following criteria.

A: No unevenness in gloss is found.

B: Slight unevenness in gloss is found.

C: Unevenness in gloss is found (the difference in gloss in the image exceeds 5°)

In the Comparative Examples, the number of outputted sheets (denoted using PV in the table) at the time of the occurrence of unevenness in gloss is shown.

The results are shown in Table 1. The details of abbreviations in Table 1 are as follows.

PI: polyimide resin

PAI: polyamide-imide resin

PEEK: polyether ether ketone resin

PPS: polyphenylene sulfide resin

PEI: polyetherimide resin

PTFE: polytetrafluoroethylene resin

T-Silicone: unmodified thermosetting silicone resin particles ("KMP-590" manufactured by Shin-Etsu Chemical Co., Ltd.)

M-Silicone: modified thermosetting silicone resin particles ("R200" manufactured by Shin-Etsu Chemical Co., Ltd.)

Silicone gum: silicone gum ("GENIOPLAST" manufactured by Wacker Asahikasei Silicone Co., Ltd.)

DSO: dimethyl silicone oil ("KF96" manufactured by Shin-Etsu Chemical Co., Ltd.)

ASO: amino-modified silicone oil ("KF8009" manufactured by Shin-Etsu Chemical Co., Ltd.)

DSO-G: dimethyl silicone oil-containing silicone grease (product name "G503" manufactured by Shin-Etsu Chemical Co., Ltd.)

FPEO: fluoropolyether oil ("DEMNUM S100" manufactured by DAIKIN INDUSTRIES, Ltd.)

FPEO-PTFEG: fluoropolyether oil-containing PTFE grease ("HP300" manufactured by Du Pont-Mitsui Fluorochemicals Co. Ltd.)

TABLE 1

| | | Example | | | | | |
|---|---|---|---|---|---|---|---|
| | | 1 | 2 | 3 | 4 | 5 | 6 |
| Pressing belt | Type | (1) | (1) | (1) | (1) | (1) | (2) |
| | Material forming inner circumferential surface | PI | PI | PI | PI | PI | PAI |
| Sliding sheet | Type | (1) | (2) | (3) | (4) | (5) | (1) |
| | Resin forming sliding surface | PEEK | PEEK | PEEK | PPS | PEEK | PEEK |
| | Material added Type/content (%) | T-Silicone/10% | T-Silicone/15% | Silicone gum/5% | T-Silicone/10% | T-Silicone/20% | T-Silicone/10% |
| Lubricant | Type | (1) | (2) | (2) | (2) | (3) | (2) |
| | Lubricant | DSO | ASO | ASO | ASO | DSO-G | ASO |
| Evaluation | Increase in torque | Increase of Δ0.41 Nm | Increase of Δ0.24 Nm | Increase of Δ0.22 Nm | Increase of Δ0.31 Nm | Increase of Δ0.31 Nm | Increase of Δ0.61 Nm |
| | Paper wrinkling | Not found: A | Not found: A | Not found: A | Not found: A | Not found: A | Not found: A |
| | Image disturbance | Not found: A | Not found: A | Not found: A | Not found: A | Not found: A | Not found: A |
| | Unevenness in gloss | Not found: A | Not found: A | Not found: A | Not found: A | Not found: A | Not found: A |

| | | Example | | | | |
|---|---|---|---|---|---|---|
| | | 7 | 8 | 9 | 10 | 11 |
| Pressing belt | Type | (3) | (4) | (1) | (1) | (1) |
| | Material forming inner circumferential surface | PEEK | PPS | PI | PI | PI |
| Sliding sheet | Type | (1) | (1) | (6) | (4) | (7) |
| | Resin forming sliding surface | PEEK | PEEK | PEI | PPS | PEEK |
| | Material added Type/content (%) | T-Silicone/10% | T-Silicone/10% | T-Silicone/10% | T-Silicone/10% | M-Silicone/10% |
| Lubricant | Type | (2) | (2) | (2) | (2) | (2) |
| | Lubricant | ASO | ASO | ASO | ASO | ASO |
| Evaluation | Increase in torque | Increase of Δ0.66 Nm | Increase of Δ0.68 Nm | Increase of Δ0.66 Nm | Increase of Δ0.66 Nm | Increase of Δ0.69 Nm |
| | Paper wrinkling | Not found: A | Not found: A | Not found: A | Not found: A | Not found: A |
| | Image disturbance | Not found: A | Not found: A | Not found: A | Not found: A | Not found: A |
| | Unevenness in gloss | Not found: A | Not found: A | Not found: A | Not found: A | Not found: A |

| | | Example | | | |
|---|---|---|---|---|---|
| | | 12 | 13 | 14 | 15 |
| Pressing belt | Type | (1) | (1) | (1) | (1) |
| | Material forming inner circumferential surface | PI | PI | PI | PI |
| Sliding sheet | Type | (8) | (9) | (10) | (11) |
| | Resin forming sliding surface | PEEK | PEEK | PEEK | PEEK |
| | Material added Type/content (%) | T-Silicone/0.5% | T-Silicone/1% | T-Silicone/20% | T-Silicone/25% |
| Lubricant | Type | (2) | (2) | (2) | (2) |
| | Lubricant | ASO | ASO | ASO | ASO |
| Evaluation | Increase in torque | Increase of Δ0.82 Nm | Increase of Δ0.78 Nm | Increase of Δ0.73 Nm | Increase of Δ0.78 Nm |
| | Paper wrinkling | Not found: A | Not found: A | Not found: A | Not found: A |
| | Image disturbance | Found but acceptable: B | Found but acceptable: B | Found but acceptable: B | Found but acceptable: B |
| | Unevenness in gloss | Found but acceptable: B | Found but acceptable: B | Found but acceptable: B | Found but acceptable: B |

| | | Comparative Example | | |
|---|---|---|---|---|
| | | 1 | 2 | 3 |
| Pressing belt | Type | (C1) | (C1) | (1) |
| | Material forming inner circumferential surface | SUS | SUS | PI |
| Sliding sheet | Type | (C1) | (C1) | (C2) |
| | Resin forming sliding surface | PTFE | PTFE | Glass cloth sheet impregnated with fluorocarbon resin |
| | Material added Type/content (%) | None | None | None |

TABLE 1-continued

| | | | | |
|---|---|---|---|---|
| Lubricant | Type | (C1) | (C2) | (C2) |
| | Lubricant | FPEO | FPEO-PTFEG | FPEO-PTFEG |
| Evaluation | Increase in torque | Increase of Δ1.3 Nm at 80 kPV | Increase of Δ1.5 Nm at 20 kPV | Increase of Δ1.2 Nm at 40 kPV |
| | Paper wrinkling | Found at 100 kPV: B | Found at 50 kPV: B | Found at 60 kPV: B |
| | Image disturbance | Found at 100 kPV: C | Found at 50 kPV: C | Found at 60 kPV: C |
| | Unevenness in gloss | Found at 80 kPV: C | Found at 25 kPV: C | Found at 45 kPV: C |

As can be seen from the above results, in the Examples, the increase in the rotational torque of the pressing belt is smaller than that in the Comparative Examples. Therefore, the occurrence of paper wrinkling and the occurrence of image disturbance are found to be reduced.

In the Examples, the unevenness in gloss of the image formed is found to be smaller than that in the Comparative Examples.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1))) A fixing device including:

a first rotatable member;

a second rotatable member disposed in contact with the first rotatable member;

a pressing member that is disposed on an inner circumferential surface of the second rotatable member and presses the inner circumferential surface of the second rotatable member such that the second rotatable member is pressed against the first rotatable member;

a sliding member interposed between the inner circumferential surface of the second rotatable member and the pressing member; and a lubricant interposed between the inner circumferential surface of the second rotatable member and the sliding member, wherein the inner circumferential surface of the second rotatable member contains a resin having at least one group selected from the group consisting of an amido group, an imido group, a ketone group, and a sulfide group, wherein a sliding surface of the sliding member contains a heat resistant thermoplastic resin other than a fluorocarbon resin and a resin having a siloxane group that is other than the heat resistant thermoplastic resin, and wherein the lubricant contains an oil having a siloxane group in a main chain.

(((2))) The fixing device according to (((1))), wherein the resin contained in the inner circumferential surface of the second rotatable member is at least one resin selected from the group consisting of polyimide resins, polyamide-imide resins, polyether ether ketone resins, and polyphenylene sulfide resins.

(((3))) The fixing device according to (((1))) or (((2))), wherein the resin contained in the inner circumferential surface of the second rotatable member is a polyimide resin.

(((4))) The fixing device according to any one of (((1))) to (((3))), wherein the heat resistant thermoplastic resin contained in the sliding surface of the sliding member is at least one resin selected from the group consisting of polyether ether ketone resins, polyphenylene sulfide resins, polyetherimide resins, and polyphenylsulfone resins.

(((5))) The fixing device according to any one of (((1))) to (((4))), wherein the heat resistant thermoplastic resin contained in the sliding surface of the sliding member is at least one resin selected from the group consisting of polyether ether ketone resins and polyphenylene sulfide resins.

(((6))) The fixing device according to any one of (((1))) to (((5))), wherein the resin having a siloxane group and contained in the sliding surface of the sliding member is at least one selected from the group consisting of thermosetting silicone resin particles and silicone oil gums.

(((7))) The fixing device according to (((6))), wherein the thermosetting silicone resin particles are unmodified thermosetting silicone resin particles.

(((8))) The fixing device according to any one of (((1))) to (((7))), wherein the content of the resin having a siloxane group and contained in the sliding surface of the sliding member is from 1.0% by mass to 20.0% by mass inclusive based on the mass of the heat resistant thermoplastic resin.

(((9))) The fixing device according to any one of (((1))) to (((8))), wherein the oil contained in the lubricant is an amino-modified silicone oil.

(((10))) The fixing device according to any one of (((1))) to (((9))), wherein the resin contained in the inner circumferential surface of the second rotatable member is at least one resin selected from the group consisting of polyimide resins, polyamide-imide resins, polyether ether ketone resins, and polyphenylene sulfide resins, wherein the heat resistant thermoplastic resin contained in the sliding surface of the sliding member is at least one resin selected from the group consisting of polyether ether ketone resins, polyphenylene sulfide resins, polyetherimide resins, and polyphenylsulfone resins, wherein the resin having a siloxane group and contained in the sliding surface of the sliding member is at least one selected from the group consisting of thermosetting silicone resin particles and silicone oil gums, and wherein the oil contained in the lubricant is an amino-modified silicone oil.

(((11))) The fixing device according to (((10))), wherein the resin contained in the inner circumferential surface of the second rotatable member is a polyimide resin.

(((12))) The fixing device according to (((11))), wherein the heat resistant thermoplastic resin contained in the sliding surface of the sliding member is at least one resin selected from the group consisting of polyether ether ketone resins and polyphenylene sulfide resins.

(((13))) The fixing device according to (((12))), wherein the thermosetting silicone resin particles are unmodified thermosetting silicone resin particles.

(((14))) The fixing device according to (((13))), wherein the content of the resin having a siloxane group and contained in the sliding surface of the sliding member is from 1.0% by mass to 20.0% by mass inclusive based on the mass of the heat resistant thermoplastic resin.

(((15))) An image forming apparatus including:

an image holding member;

a latent image forming device that forms a latent image on a surface of the image holding member;

a developing device that develops the latent image using a developer to form a toner image;

a transfer device that transfers the developed toner image onto a recording medium; and the fixing device according to any one of (((1))) to (((14))), the fixing device fixing the toner image to the recording medium.

What is claimed is:

1. A fixing device comprising:

a first rotatable member;

a second rotatable member disposed in contact with the first rotatable member;

a pressing member that is disposed on an inner circumferential surface of the second rotatable member and presses the inner circumferential surface of the second rotatable member such that the second rotatable member is pressed against the first rotatable member;

a sliding member interposed between the inner circumferential surface of the second rotatable member and the pressing member; and a lubricant interposed between the inner circumferential surface of the second rotatable member and the sliding member, wherein the inner circumferential surface of the second rotatable member contains a resin having at least one group selected from the group consisting of an amido group, an imido group, a ketone group, and a sulfide group, wherein a sliding surface of the sliding member contains (A) a heat resistant thermoplastic resin and (B) a resin having a siloxane group, wherein the lubricant contains an oil having a siloxane group in a main chain, wherein the heat resistant thermoplastic resin is at least one resin selected from the group consisting of polyether ether ketone resins, polyphenylene sulfide resins, polyetherimide resins, polyphenylsulfone resins, polyethersulfone resins, and polysulfone resins, wherein the heat resistant thermoplastic resin is not a fluorocarbon resin, wherein the resin having a siloxane group is at least one selected from the group consisting of thermosetting silicone resin particles and silicone oil gums, silicone elastomers, and siloxane-modified polyetherimides.

2. The fixing device according to claim 1, wherein the resin contained in the inner circumferential surface of the second rotatable member is at least one resin selected from the group consisting of polyimide resins, polyamide-imide resins, polyether ether ketone resins, and polyphenylene sulfide resins.

3. The fixing device according to claim 1, wherein the resin contained in the inner circumferential surface of the second rotatable member is a polyimide resin.

4. The fixing device according to claim 1, wherein the heat resistant thermoplastic resin contained in the sliding surface of the sliding member is at least one resin selected from the group consisting of polyether ether ketone resins and polyphenylene sulfide resins.

5. The fixing device according to claim 1, wherein the thermosetting silicone resin particles are unmodified thermosetting silicone resin particles.

6. The fixing device according to claim 1, wherein the content of the resin having a siloxane group and contained in the sliding surface of the sliding member is from 1.0% by mass to 20.0% by mass inclusive based on the mass of the heat resistant thermoplastic resin.

7. The fixing device according to claim 1, wherein the oil contained in the lubricant is an amino-modified silicone oil.

8. The fixing device according to claim 1, wherein the resin contained in the inner circumferential surface of the second rotatable member is at least one resin selected from the group consisting of polyimide resins, polyamide-imide resins, polyether ether ketone resins, and polyphenylene sulfide resins, and wherein the oil contained in the lubricant is an amino-modified silicone oil.

9. The fixing device according to claim 8, wherein the resin contained in the inner circumferential surface of the second rotatable member is a polyimide resin.

10. The fixing device according to claim 9, wherein the heat resistant thermoplastic resin contained in the sliding surface of the sliding member is at least one resin selected from the group consisting of polyether ether ketone resins and polyphenylene sulfide resins.

11. The fixing device according to claim 10, wherein the thermosetting silicone resin particles are unmodified thermosetting silicone resin particles.

12. The fixing device according to claim 11, wherein the content of the resin having a siloxane group and contained in the sliding surface of the sliding member is from 1.0% by mass to 20.0% by mass inclusive based on the mass of the heat resistant thermoplastic resin.

13. An image forming apparatus comprising:

an image holding member;

a latent image forming device that forms a latent image on a surface of the image holding member;

a developing device that develops the latent image using a developer to form a toner image;

a transfer device that transfers the developed toner image onto a recording medium; and the fixing device according to claim 1, the fixing device fixing the toner image to the recording medium.

14. An image forming apparatus comprising:

an image holding member;

a latent image forming device that forms a latent image on a surface of the image holding member;

a developing device that develops the latent image using a developer to form a toner image;

a transfer device that transfers the developed toner image onto a recording medium; and the fixing device according to claim 2, the fixing device fixing the toner image to the recording medium.

15. An image forming apparatus comprising:

an image holding member;

a latent image forming device that forms a latent image on a surface of the image holding member;

a developing device that develops the latent image using a developer to form a toner image;

a transfer device that transfers the developed toner image onto a recording medium; and the fixing device according to claim 3, the fixing device fixing the toner image to the recording medium.

16. An image forming apparatus comprising:

an image holding member;

a latent image forming device that forms a latent image on a surface of the image holding member;

a developing device that develops the latent image using a developer to form a toner image;

a transfer device that transfers the developed toner image onto a recording medium; and the fixing device according to claim 1, the fixing device fixing the toner image to the recording medium.

17. An image forming apparatus comprising:

an image holding member;

a latent image forming device that forms a latent image on a surface of the image holding member;

a developing device that develops the latent image using a developer to form a toner image;

a transfer device that transfers the developed toner image onto a recording medium; and the fixing device according to claim 4, the fixing device fixing the toner image to the recording medium.

18. An image forming apparatus comprising:

an image holding member;

a latent image forming device that forms a latent image on a surface of the image holding member;

a developing device that develops the latent image using a developer to form a toner image;

a transfer device that transfers the developed toner image onto a recording medium; and the fixing device according to claim 1, the fixing device fixing the toner image to the recording medium.

19. The fixing device according to claim 1, wherein the resin having a siloxane group and contained in the sliding surface of the sliding member is at least one selected from the group consisting of thermosetting silicone resin particles, silicone oil gums, silicone elastomers, and siloxane-modified polyetherimides.

20. The fixing device according to claim 1, wherein the sliding surface of the sliding member is obtained by mixing and melting (A) the heat resistant thermoplastic resin and (B) the resin having the siloxane group.

* * * * *